United States Patent
Szabo et al.

(10) Patent No.: US 10,451,183 B2
(45) Date of Patent: Oct. 22, 2019

(54) TRANSMISSION CONTROL SYSTEM

(71) Applicant: ZF Friedrichshafen AG, Friedrichshafen (DE)

(72) Inventors: Tomas Szabo, Ravensburg (DE); Knut Graichen, Blaubeuren (DE); Sebastian Hentzelt, Braunschweig (DE)

(73) Assignee: ZF FRIENDRICHSHAFEN AG, Friedrichshafen (DE)

( * ) Notice: Subject to any disclaimer, the term of this patent is extended or adjusted under 35 U.S.C. 154(b) by 23 days.

(21) Appl. No.: 15/825,194

(22) Filed: Nov. 29, 2017

(65) Prior Publication Data
US 2018/0149266 A1 May 31, 2018

(30) Foreign Application Priority Data
Nov. 30, 2016 (DE) .......................... 10 2016 223 874

(51) Int. Cl.
*F16H 61/686* (2006.01)
*F16H 61/70* (2006.01)
(Continued)

(52) U.S. Cl.
CPC ........... *F16H 61/686* (2013.01); *F16H 61/08* (2013.01); *F16H 61/70* (2013.01); *F16H 61/702* (2013.01);
(Continued)

(58) Field of Classification Search
None
See application file for complete search history.

(56) References Cited

U.S. PATENT DOCUMENTS

| 4,757,886 A | * | 7/1988 | Brown | ................... B60W 30/18 192/103 F |
| 4,799,158 A | * | 1/1989 | Patil | .................... F16H 61/0437 477/154 |

(Continued)

FOREIGN PATENT DOCUMENTS

DE 10 2011 075 913 A1 11/2012

OTHER PUBLICATIONS

German Search Report issued in corresponding German Patent Application No. 10 2016 223 874.4 dated Jan. 24, 2018.
(Continued)

*Primary Examiner* — Dirk Wright
(74) *Attorney, Agent, or Firm* — Davis & Bujold PLLC; Michael J. Bujold

(57) ABSTRACT

A transmission which includes input and output shafts and first and second step-down devices for producing various step-down ratios. The first and second step-down devices are associated with first and second controllable clutches, respectively, in order to connect, in a torque-transmitting manner, the respective step-down device between the input shaft and the output shaft. A first gear of the transmission is obtained by actuating the first clutch and a second gear by actuating the second clutch. A method of controlling a gearshift, from the first gear to the second gear, includes the steps of determining operating condition parameters of the transmission; and determining optimized degrees of actuation of the clutches by a search process related to a transmission model that determines the degrees of actuation on the basis of operating condition parameters in relation to a predetermined optimization criterion. The transmission model is based on slip.

9 Claims, 3 Drawing Sheets

(51) Int. Cl.
*F16H 61/08* (2006.01)
*F16H 61/16* (2006.01)
*F16H 61/00* (2006.01)

(52) U.S. Cl.
CPC ............ *F16H 2061/0093* (2013.01); *F16H 2061/085* (2013.01); *F16H 2061/161* (2013.01); *F16H 2300/02* (2013.01); *F16H 2302/02* (2013.01); *F16H 2306/30* (2013.01); *Y02T 10/56* (2013.01)

(56) References Cited

U.S. PATENT DOCUMENTS

| | | | | |
|---|---|---|---|---|
| 4,821,190 | A * | 4/1989 | Patil | F16H 61/0437 477/149 |
| 4,855,914 | A * | 8/1989 | Davis | B60W 10/115 701/60 |
| 5,123,302 | A * | 6/1992 | Brown | F16H 61/061 477/154 |
| 5,343,782 | A * | 9/1994 | Jamzadeh | F16H 61/061 477/156 |
| 5,596,256 | A * | 1/1997 | Takizawa | B65G 43/08 318/600 |
| 5,895,435 | A * | 4/1999 | Ohta | F16H 61/0213 477/120 |
| 7,853,338 | B1 * | 12/2010 | Hovakimyan | G05B 13/027 700/31 |
| 8,214,116 | B2 * | 7/2012 | Whitton | F16H 61/0204 701/55 |
| 8,275,527 | B2 * | 9/2012 | Hebbale | G06F 17/5095 701/51 |
| 9,169,921 | B2 * | 10/2015 | Byerly | F16H 61/0437 |
| 9,291,261 | B2 * | 3/2016 | Munch | F16H 61/68 |
| 10,174,837 | B2 * | 1/2019 | Funyak | B60W 50/0205 |
| 2015/0032347 | A1 | 1/2015 | Byerly et al. | |

OTHER PUBLICATIONS

Michalka et al., "Model-Based Control Calculation for Dual-Clutch Transmissions as Part of a New Overall Concept for Transmission Control and Regulation", Automation Technology, vol. 57, pp. 230-237, 2009.

* cited by examiner

TRANSMISSION CONTROL SYSTEM

This application claims priority from German patent application serial no. 10 2016 223 874.4 filed Nov. 30, 2016.

FIELD OF THE INVENTION

The present invention concerns a transmission control system. In particular, the invention concerns the control of a gearshift in a powershiftable transmission.

BACKGROUND OF THE INVENTION

A transmission comprises an input shaft, an output shaft and a speed-change transmission with a plurality of gears which can be engaged alternatively to transmit torque between the shafts. Each gear is associated with a clutch so that the disengagement of a first gear and the engagement of another gear can overlap in time. Consequently, the gearshift can take place without interrupting the torque transmitted, and this is referred to as a gearshift free from traction force interruption.

The actuations of the clutches involved in a gearshift must be matched precisely with one another in order to influence the torque transmitted during the shift as uniformly as possible and so as not to overload any element of the transmission. For example, the clutches can be actuated gradually by hydraulic or mechanical means in order to control slip in the clutch. For example, during the transition from a non-actuated to a fully actuated condition an actuation trajectory for the clutch can be determined, which indicates the degree of its actuation over a predetermined time interval. Such an actuation trajectory is usually determined once and for all either empirically or on the basis of simple assumptions, and then used unchanged thereafter. For the determination, safety margins are usually allowed, for example in order to take into account the influence of temperature, wear or a measurement error. Thus, the precision or efficiency of a transmission control system based on this can be limited.

DE 10 2011 075 913 A1 proposes that the actuation trajectories should be determined on the basis of operating condition parameters of the transmission.

SUMMARY OF THE INVENTION

A transmission comprises an input shaft and an output shaft, and first and second step-down devices in order to provide various step-down ratios. The first step-down device is associated with a first controllable clutch and the second step-down device with a second controllable clutch, in order to connect the respective step-down device in a torque-transmitting manner between the input shall and the output shaft. A first gear of the transmission can be obtained by actuating the first clutch and a second gear by actuating the second clutch. A method for controlling a gearshift from the first to the second gear includes steps for determining operating condition parameters of the transmission and for determining optimized degrees of actuation of the clutches by means of a search process related to a transmission model, which determines the degrees of actuation on the basis of operating condition parameters in relation to a predetermined optimization criterion. In this case the transmission model is based on slip.

The operating condition parameters can for example include rotational speeds, transmitted torques or other magnitudes that can be observed in the transmission. Indeterminable influencing magnitudes such as a mass moment of inertia of a device connected to the transmission can be indicated.

By virtue of the slip-based transmission model, the complexity of the model can be reduced. Thus, optimization can be carried out in a short time, or within a predetermined optimization time, a further optimized solution can be found. Accordingly, the method can be carried out on a low-performance processing device. Furthermore, the physical model can be designed more accurately so that the solution determined can better fit the assumptions and measured values of the transmission.

The model-based approach can manage adequately without complex measurements or parameterization relating to a transmission type, a transmission design or an individual transmission. A gearshift can be performed rapidly and simply in a better way. At the control device level, the method can be carried out in real time. Moreover the concept can be transferred to other transmissions. In particular, group shifts with a plurality of transmission groups can be assisted.

Preferably, a plurality of degrees of actuation are determined for a sequence of future time-points. The degrees of actuation (solution trajectories) are preferably parameterized over time at fixed time-points. This parameterization can for example be interpolated by means of functions Oar example linear or quadratic) between two time-points. The number of time-points or their time duration can be predetermined. Thus, the determination of the degrees of actuation of the clutches can be carried out in relation to a time window of predetermined length, so that the effort for determining the optimized actuations is limited. Thus, a further improved optimization can be achieved.

In a further preferred embodiment, the method is carried out periodically so as to provide respectively optimized numbers of degrees of actuation. In this case actuation of the clutches preferably takes place at the same time, so that the degrees of actuation can be determined for a sliding time window or a sliding horizon. By virtue of such periodic determination current operating condition parameters of the transmission can be used again and again. Unnecessary determinations for an already past time-point can be avoided. Thus, the degrees of actuation determined can be improved incrementally. If an end time at which the gearshift is completed is predetermined, then if the time remaining until the end time is shorter than the time window a smaller number of degrees of actuation can be determined. Particular sequential degrees of actuation can have unchanged, equal time intervals between one another. By virtue of the periodic or incremental determination it is possible to react dynamically in a better way to a change of external parameters before or during the gearshift.

In a further variant the degrees of actuation can in each case be determined for the time remaining until the end time. During the course of the gearshift the time remaining becomes continually shorter, so that with degrees of actuation equally separated in time there can always be more determination time available for each actuation degree. Thus the optimization can become better, the farther advanced the gearshift is. Effectively, in that way the gearshift can already have started when for a first time-point degrees of actuation exist whose optimization is not particularly advanced, so that their course is suboptimal. The method can be carried out in real time, so that at a predetermined time a solution is always produced, even if its course is possibly suboptimal.

The degree of actuation determination can in particular include an optimization on whole-number parameters. A determination accuracy can for example be made almost arbitrarily high by the use of high-precision numerical libraries such as MPC (multi precision computing). Furthermore, more rapidly converging search methods can be used, such as integer or mixed integer linear optimization (mixed integer linear processing, MIP), for which running time environments are already available. The optimization problem concerned then only has to be suitably formulated and the model appropriately set up.

In an embodiment, on the basis of the plurality of degrees of actuation, actuation trajectories are determined for the clutches. The actuation trajectories can include interpolations for degrees of actuation between time-points for which degrees of actuation have been determined. On the basis of the actuation trajectories, the clutches can be controlled better or more easily.

The method can also include the control or regulation of the clutches. In this case the degrees of actuation or actuation trajectories determined can be used as nominal specifications. In particular an actuation of a clutch can include control of a hydraulic or pneumatic valve or of an electric or electro-hydraulic actuator. Thus, the overall transmission control for changing the gear engaged can be carried out by means of an integrated method.

The method can be carried out in a control device, the control device comprising a processing device designed to implement at least part of the method described above. The processing device can comprise a programmable microcomputer or microcontroller. Features or advantages applicable to the control device can be transferred to the method, and vice-versa.

BRIEF DESCRIPTION OF THE DRAWINGS

The invention will now be described with reference to the attached figures, which show.

DETAILED DESCRIPTION OF THE PREFERRED EMBODIMENTS

Figure 1:
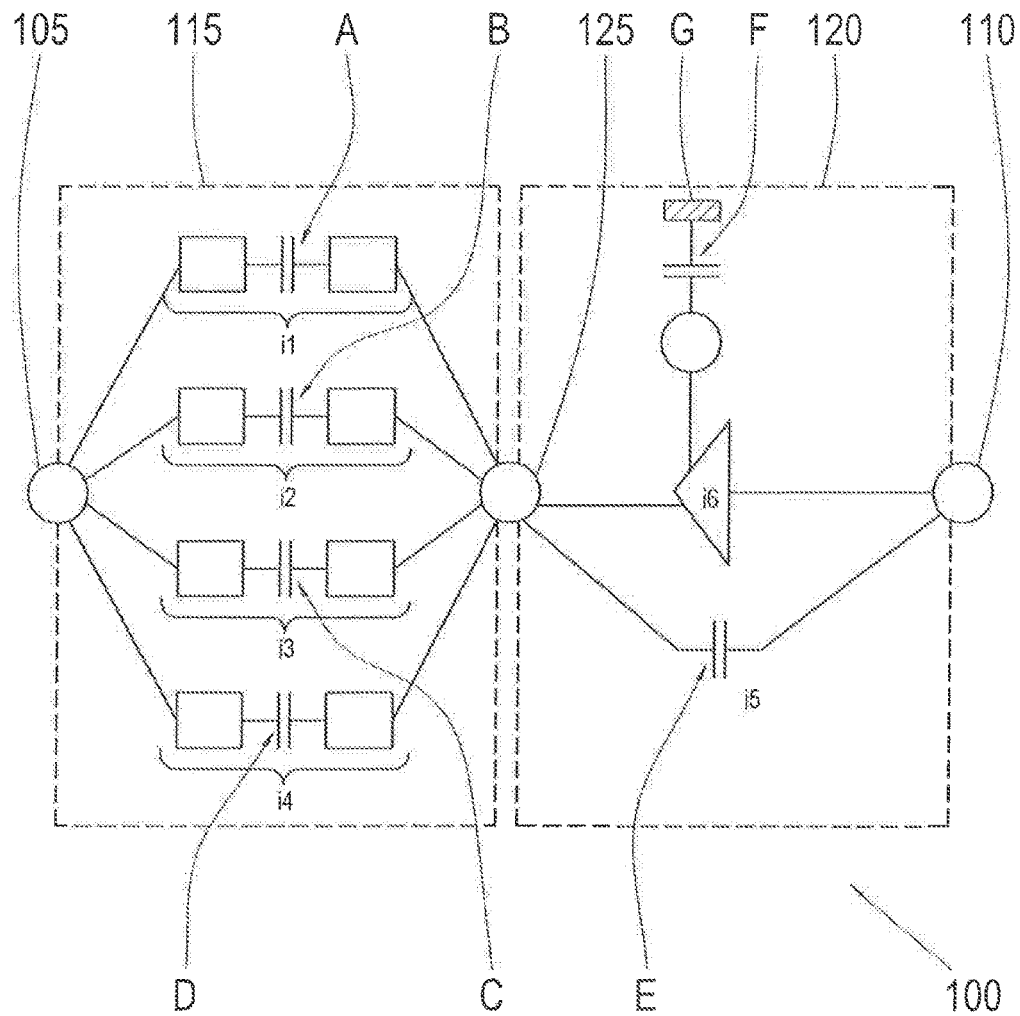
FIG. 1: A schematic representation of a transmission.

FIG. 1 shows a schematic representation of a transmission 100 for use in a drive-train, in particular that of a motor vehicle. More preferably still, the motor vehicle can be a utility vehicle, for example a truck or a construction machine. The transmission comprises an input shaft 105, an output shaft 110, a first transmission group 115 and optionally a second transmission group 120. Further, transmission groups 115, 120 can if necessary be connected in series with the other groups. Between consecutive transmission groups 115, 120 there is usually in each case an intermediate shaft 125. The form illustrated, with two transmission groups 115, 120, is also known as a Double Group Power Shift (DGPS).

Each transmission group 115, 120 comprises a plurality of step-down ratios i1 to i6, of which when a gearshift is not taking place only one in each transmission group 115, 120 is active. For example, in this case the first transmission group 115 has four step-down ratios i1 to i4 and, again as an example, the second transmission group 120 has two step-down ratios i5 and i6. The reduction ratios i1 to i4 are usually relatively narrow in the speed factors which they each realize, and the first transmission group 115 is also called a splitter. The step-down ratios i5 and i6 of the second transmission group 120 are usually farther apart in their rotational speed factors, and the second transmission group 120 is also called the main transmission or main group.

Each step-down ratio i1 to i6 is usually formed by an associated gears et which comprises at least two gearwheels that mesh with one another. In alternative embodiments any other devices can also be used which are designed in each case to step down a rotational speed of an input side by a predetermined factor and transmit the stepped-down rotational speed to the output side. In an alternative embodiment the rotational speed can also be increased (stepped up instead of stepped down).

With each step-down ratio i1 to i6 in the transmission 100 there is associated a clutch A to F. When a clutch A to F of the transmission 100 is actuated it is closed and torque can be transmitted by the associated step-down ratio i1 to i6. When unactuated the clutch A to F is open and no torque transmission takes place. In another embodiment the clutch A to F can instead be closed when not actuated and open when actuated. The combination of activated step-down ratios i1 to i6, i.e. participating in the transmission of torque between the input shaft 105 and the output shall 110, constitutes a gear engaged in the transmission. The clutches A to F are usually in the form of friction disk clutches or friction brakes and can preferably be actuated gradually, in particular continuously. The actuation of a clutch A to F can for example be described on a scale of 0% to 100%. If a clutch A to F is only partially closed, then it is in a slipping condition so that although it is transmitting some torque, its input side has a different rotational speed from its output side. For example, the clutches A to F can be controlled electrically, electro-hydraulically or hydraulically, so that the degree of actuation of each clutch A to F can be controlled for example by means of an electronic control device.

To match the opening or closing of clutches A to F with one another, actuation trajectories can be determined each of which establishes a progression in time of an actuation of an associated clutch A to F. The actuation trajectory takes place within a time interval in which the gearshift takes place, usually from 0% to 100% or vice-versa. An actuation trajectory can enable a sequence of different shift phases within the gearshift, which occur one after another, for example at least one transition phase and one sliding phase. In the transition phase the degree of actuation of a clutch A to F is gradually changed from slipping operation to the closed condition, or vice-versa. In the sliding phase a rotational speed difference between an input side and an output side of a step-down ratio i1 to i6 is reduced, since the associated clutch A to F is only partially actuated.

In the embodiment illustrated, the first transmission group 115 has for example four step-down ratios i1 to i4 arranged parallel with one another between the input shaft 105 and the intermediate shaft 125, each step-down ratio being respectively associated with clutches A to D.

In the embodiment illustrated, the second transmission group 120 is in the form of an epicyclic transmission, in particular a planetary gearset with a sun gear, a planetary gearwheel on a planetary gear carrier and a ring gear. In the embodiment illustrated, the sun gear is coupled to the output shaft 110 and the planetary gear carrier is coupled to the intermediate shaft 125. By means of the clutch F, the ring gear can be coupled to the surroundings, for example to a housing of the transmission 100. Thus, the clutch F can act as a so-termed brake by means of which the ring gear can be positionally fixed, i.e. for example braked or held fast against the housing. The step-down ratio i5 is controlled by closing the clutch E and opening the clutch F. The intermediate shaft 125 and the output shaft 110 then rotate at the same rotational speed, so that the ratio i5 equals unity. The step-down ratio i6 is controlled by opening the clutch E and closing the clutch F. In other embodiments the second transmission group 120 can also be configured differently, for example by connecting a planetary gearset in some other way to the intermediate shaft 125, the output shaft 110 and an environment, or by designing the second transmission group 120 in accordance with the principle of the first transmission group 115.

The step-down ratios i1 to i6 are preferably chosen such that a change through successive gears of the transmission 100 requires as few changes of the step-down ratio of the second transmission group 120 as possible. In the embodiment illustrated, when changing through all the gears in sequence the ratios i1 to i4 can be activated in combination with the ratio i5, and thereafter again the ratios i1 to i4 can be activated consecutively, this time in combination with the ratio i6. In this case, as an example it is assumed that all the combinations of ratios i1 to i4 with ratios i5 or i6 produce the same rotational direction between the input shaft 105 and the output shaft 110. Accordingly, in the embodiment shown here eight gears can be produced in the transmission 100. The spread between the gears is preferably as uniform as possible, and the change of the step-down ratio effective between the input shaft 105 and the output shaft 110 when changing from one gear to an adjacent gear is preferably at least approximately equal for all possible such changes.

In the constellation shown, a change from the fourth to the fifth gear (or vice-versa) requires both a change of the activated ratio i1, i4 in the first transmission stage 115, and also of the activated ratio i5, i6 in the second transmission stage 120. Such a change is also known as a group change powershift or two-group powershift. All other changes between adjacent gears are simple gearshifts (simple powershifts) and require only one change of the activated ratios i1 to i6 in one of the two transmission stages 115, 120.

In all transitions from one to another gear care should be taken that if possible no element of the transmission 100 is overloaded. In particular the group change powershift may entail high loads, since during it, in the first transmission group 115 a shift has to be carried out between the highest and the lowest ratio so that the rotational speed of the intermediate shaft 125 undergoes a large change. Synchronization of the second transmission group 120 during this can produce large forces, for example on a shaft or a gearset of the second transmission group 120, and the same applies to the load on the respectively corresponding clutch (friction work, friction power). Even in a simple gearshift certain specifications should be respected, for example a torque transmitted by a clutch A to F should not exceed a predetermined value or a rotational speed of a shaft or a gearset should remain below a certain maximum value. Even a minimum or maximum duration of the gearshift process, or time limits for other transitions or events can be specified as boundary conditions. The latter are particularly helpful for differentiating between a comfort-orientated or a time-optimized (i.e. rapid) shift.

Figure 2:
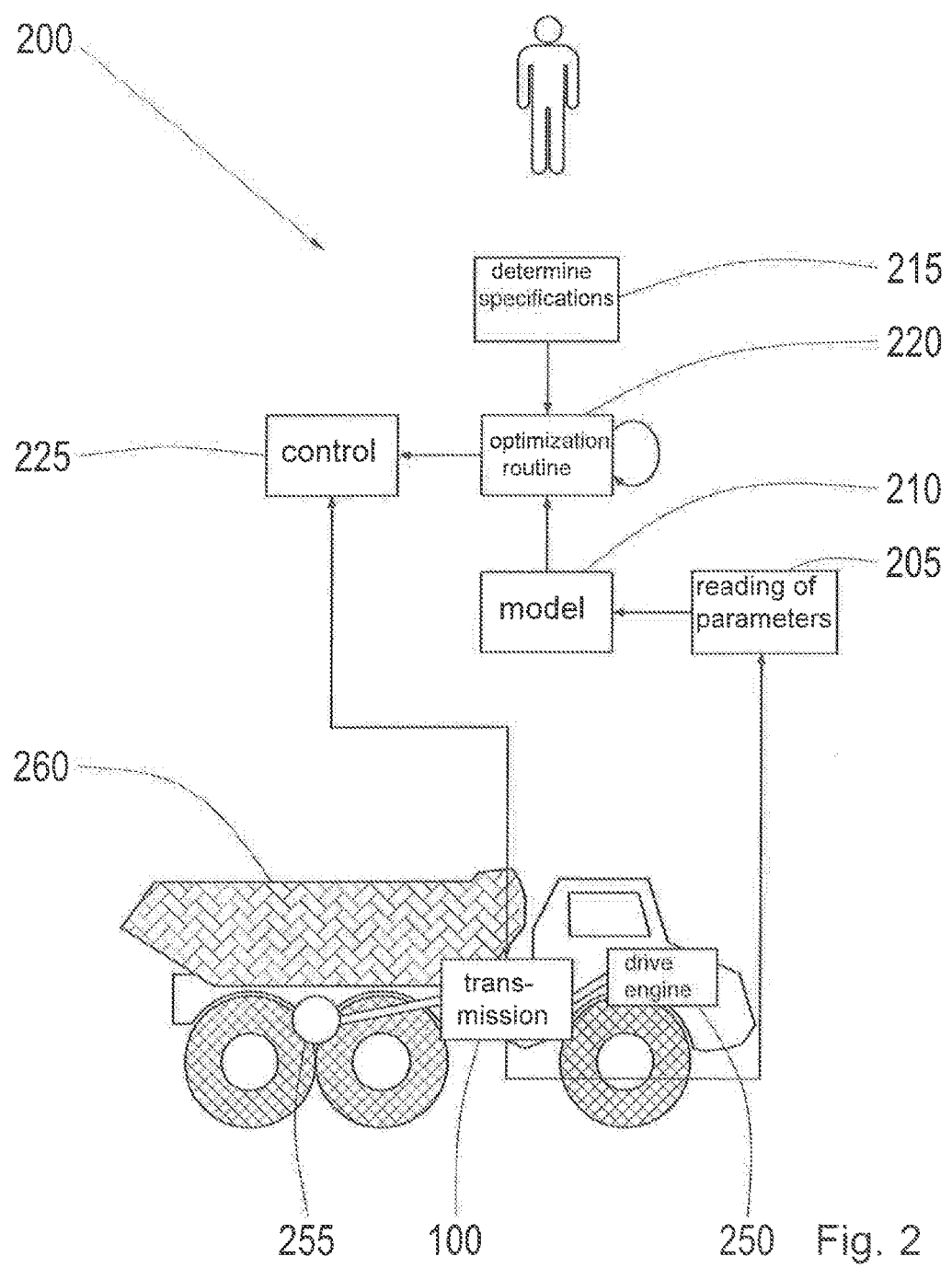
FIG. 2: A flow-chart of a method for controlling a transmission.

FIG. 2 shows a flow-chart for a method 200 for controlling a change of an engaged gear in a transmission 100. The method 200 can in particular be used for controlling the transmission 100 represented in FIG. 1, and is based on a method described in DE 10 2011 075 913 A1. However, it can also be used correspondingly in transmissions with more than one group for two-group shifts.

In a step 205 one or more operating condition parameters of the transmission 100 are detected. For this, the operating condition parameters can for example be obtained via an interface, or determined by means of sensors. The operating condition parameters are used as input magnitudes for a model 210 which describes inertias, step-down ratios i1 to i6 and physical boundary conditions in order to ensure compliance with physical laws. The model 210 usually describes the transmission 100 in the form of a differential equation system. The magnitudes emitted by the model 210 are determined as a function of an operating condition of the vehicle drive-train 255, having regard to the gear engaged in the transmission 100.

In a step 215 specifications are determined, which for example can be stipulated by a user. The specifications can for example relate to a boundary condition or an optimization criterion when changing a gear in the transmission 100.

An optimization routine 220 uses these specifications together with situation-independent, time-invariant magnitudes, i.e. the inertias of a drive machine 225 connected to the input shaft 105 of the transmission 100, various shafts of a vehicle drive-train 255 connected to the output shaft 110 of the transmission 100, and a vehicle body of a vehicle 260 made with the drive-train 255. In addition situation-dependent, time-variable magnitudes such as rotational accelerations of the shafts of the vehicle drive-train 255 and adjustment torques and resistance torques of the model 210 depicting the vehicle drive-train 255 can be used. The purpose of the optimization routine 220 is to find and provide, from a multiplicity of possible solutions, a solution optimized in relation to an optimization criterion. The solutions comprise in particular degrees of actuation of the clutches A to F involved in the gearshift in progress. It is also possible to determine a multiplicity of solutions for consecutive points in time, so that on the basis of the solutions actuation trajectories can be prepared. Optionally, a particular solution can be implemented in a step 225 by actuating the transmission 100 or the clutches A to F involved in the appropriate manner.

As optimization methods, methods of linear optimization such as simplex methods or internal-point methods for linear problems, or methods of restricted non-linear optimization such as quadratic optimization methods, SQP methods, internal-point methods or gradient methods for non-linear problems can be used. In an off-line computation of the optimization problem or an off-line determination of the shifting sequence of a ratio change in the transmission 100, heuristic methods such as simulated annealing, stochastic search methods, genetic methods, evolutionary algorithms or deterministic approaches such as screening or segmentation techniques can also be used.

It is preferable to repeat the determination of the solutions periodically. Particularly preferably, while the gearshift is in progress actuation trajectories for the clutches A to F should be determined continually in order to achieve continuously improving control. Usually a shift duration, i.e. the time between beginning and ending the shifting process is predetermined and thus known in advance. The farther the gearshift has already progressed, the fewer solutions have to be determined in order to be able to determine trajectories for the remaining time. For example, if the gearshift lasts around 0.2 seconds and a degree of actuation has to be determined for each of two clutches A to at intervals of 0.01 seconds, then at the start 2*0.2/0.01=20 degrees of actuation are determined. If already 0.1 second of the change process has passed, then with otherwise unchanged specifications only 10 degrees of actuation have to be determined for the remaining actuation trajectories. If the actuation trajectories are determined at equal time intervals, for example also every 0.01 seconds, there remains ever more time available for the determination of the rest of the degrees of actuation. The above example figures can be treated as parameters in order to adapt the method 200 for a predetermined purpose. In particular, it can be specified how frequently the degrees of actuation are determined.

The determination includes an optimization which, with increasing determination time available, can also provide ever-better solutions so that a previously determined actuation trajectory can be carried forward in a successively improved manner while it is taking place at the clutches A to F. A processing device on which the method 200 is running does not therefore have to be particularly powerful. It suffices if, at or before the beginning of the gearshift process, it can provide at least a sub-optimal, approximate solution. This approximate solution can be improved while the gearshift is in progress.

For determining the actuation trajectories it is preferable to consider the complete shift process. Otherwise than in a procedure in which only iterative degrees of actuation are determined for a single existing time-point, it can in this way be ensured that optimization takes place over all the predetermined parameters. Predetermined boundary conditions or parameter limits can be complied with in a better way over the whole of the shift process.

The method 200 can be used to assist a gearshift in a transmission with one or more transmission groups 115, 120. Thanks to the model-based determination the shifting process can be determined optimally. In this, it is particularly preferable to carry out a determination relating to the shifting process as a whole, in particular as far as a predetermined end point at which the shifting process has in any case been completed. It is then not necessary to consider shifting phases separately. In this way it can be ensured that the entire shifting process is optimized, and not just one of the shifting phases without regard for some other shifting phase. For example this can be done for a shifting sequence in which several gearshifts are carried out one after another, particularly via adjacent gears. A gearshift can already be prepared while the gearshift before it is still in progress.

A desired load torque can be taken into account predictively during the shifting process. The optimal shifting processes can be determined having regard to wear or shifting duration. The duration of shifting phases can be specified or taken into account. A load on an individual clutch can be relieved selectively. The method 200 can be provided generically for a transmission 100. The method 200 can also be structured in a modular way, such that modules can be exchanged as a function of the components of the transmission 100 in use. For example, modules can be provided for various transmission principles, various numbers of step-down ratios i1 to i6, various step-down devices or various numbers of transmission groups 115, 120. In the modules the step-down ratios i1 to i6 can for example be established. Different signal durations or idle times of individual actuation devices for a clutch A to F can be taken into account by predictive regulation with a sliding horizon.

Shifting processes between different gears can be made more flexible. The method can be used in simplified form for various single- or multi-group transmissions. The wear of components of the transmission 100 can be minimized. At the same time, the shift quality can be optimized or the shifting time minimized. Torque limits of a drive engine or a clutch A to F can be reliably complied with. A desired load torque or a drive output rotational speed during the shifting process can be maintained. The method can be carried out in a control unit with better real-time capability. This means that within a predetermined optimization time a solution can be provided in any case. In general the quality of the solution can be improved up to a certain degree, in that the optimization time is made longer. In many optimization processes, for example MIP, together with a solution provided it can be known how far removed it is from a theoretically attainable solution.

Figure 3:
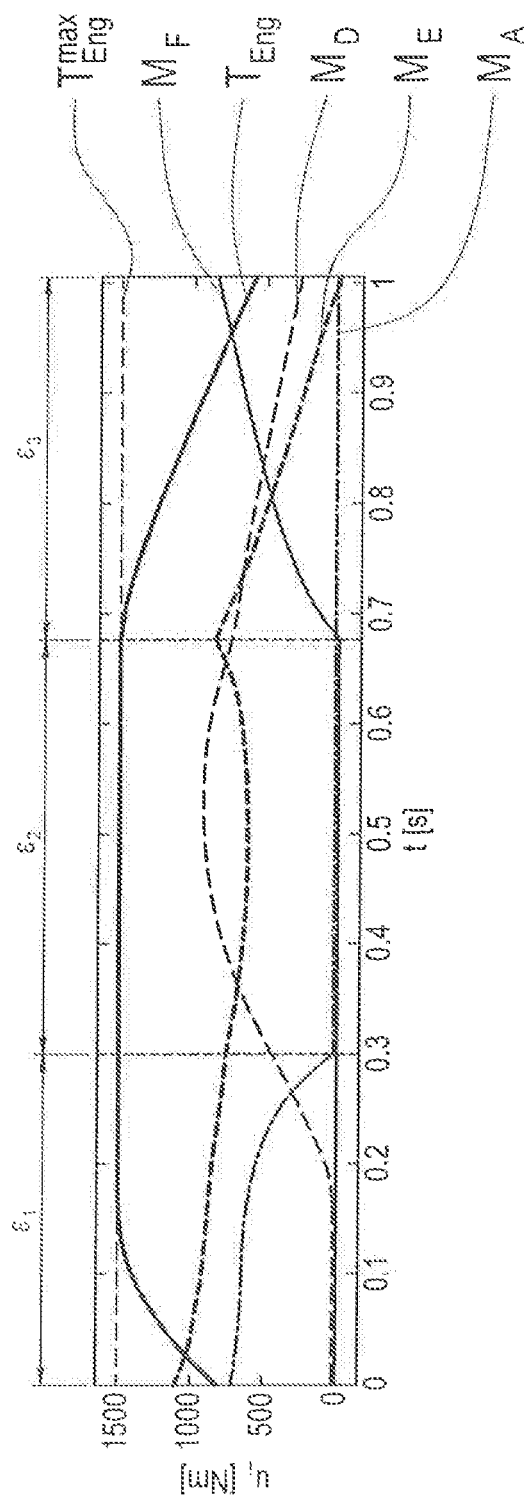
FIG. 3: Example progressions of torques transmitted in a transmission.

FIG. 3 shows example progressions or trajectories for an example transmission 100 during a change of the gear engaged. As an example, a transmission 100 with two transmission groups 115, 120 of the type shown in FIG. 1 during a two-group powershift change is taken as the basis. In the horizontal direction the time is plotted, which is divided into three shift phases $\varepsilon 1$, $\varepsilon 2$, $\varepsilon 3$. In the vertical direction a torque is plotted. Torques $M_A$, $M_D$, $M_E$ and $M_F$ are associated with the clutches A, D, E and F. The torque provided by the drive engine 250 is denoted $T_{Eng}$ and a maximum torque that can be produced by the drive engine 250 is shown as $T_{Eng}^{max}$.

Instead of representing an almost closed clutch A to F operating with slip, in this case operation takes place in so-termed micro-slip $\varepsilon > 0$, i.e. a very small amount of slip which ensures that the clutch torque is transmitted in the direction of the drive output shaft. Above all else this serves to simplify the calculation, and the clutch does not have to be kept in micro-slip. A more exact description of this concept is given in Michalka, Ropenecker, Wurmthaler, C.; and Orend, R.: *Model-based control calculation for dual-clutch transmissions as part of a new overall concept for transmission control and regulation*, in Automatisierungstechnik (Automation technology), Vol. 57, pages 230-237, 2009.

It is assumed that only clutches i (where i=A to F) are transmitting a positive torque $T_i \geq 0$, whose slip $S_i$ allows the transmission of this torque in the direction of the drive output inertia $J_{out}$. It should be noted that owing to the inverting effect of the gears upstream from the clutches A and F these two clutches both have to be operated with negative slip $S_A < 0$ and $S_E < 0$, in order to pass on the corresponding torques in the direction of the drive output inertia $J_{out}$.

At the beginning of the shift the fourth gear is engaged and:

$S_A > 0$; $S_D = S_\varepsilon$; $S_E < 0$; $S_F = S_\varepsilon$, so that D and F are transmitting torque.

After the first shifting phase $\varepsilon 1$:

$S_A > 0$; $S_D > 0$; $S_E < 0$; $S_F > 0$, so that D and E are transmitting torque.

After the second shifting phase $\varepsilon 2$:

$S_A = -S_\varepsilon$; $S_D > 0$; $S_E = -S_\varepsilon$; $S_F < 0$; so that D and F are transmitting torque.

After the third shifting phase $\varepsilon 3$, at the end of the shift, the fifth gear is engaged and:

$S_A = -S_\varepsilon$; $S_D > 0$; $S_E = -S_\varepsilon$; $S_F < 0$, so that A and E are transmitting torque.

In the above, $S_A$ to $S_F$ denote, respectively, the slip of a clutch A to F.

The torques shown in FIG. 3 can correspond to degrees of actuation, so the progressions can correspond to actuation trajectories. It can be seen that the torque progressions in FIG. 3 are linear in some parts but non-linear overall.

INDEXES

100 Transmission
105 Input shaft
110 Output shaft

115 First transmission group (splitter)
120 Second transmission group (group)
125 Intermediate shaft
i1-i6 Step-down ratio
A-F Clutch
200 Method
205 Reading of operating condition parameters
210 Model
215 Determination of specifications
220 Optimization routine
225 Control
250 Drive engine
255 Vehicle drive-train
260 Vehicle

The invention claimed is:

1. A method of controlling a gearshift from a first to a second gear in a transmission, the transmission comprising: an input shaft and an output shaft; first and second step-down devices for providing various step-down ratios; and, in order to connect the respective first and second step-down devices in a torque-transmitting manner between the input shaft and the output shaft, a first clutch being associated with the first step-down device and a second clutch being associated with the second step-down device; and the first gear being obtainable by actuating the first clutch and the second gear by activating the second clutch, the method comprises:

determining operating condition parameters of the transmission, the operating condition parameters comprising at least one of a rotational speed and a transmitted toque of at least one of the input shaft, the output shaft, the first clutch, the second clutch, an intermediate shaft, and input sides and output sides of the first and the second step-down devices;

determining optimized degrees of actuation of the first and the second clutches by a search method relating to a transmission model, which determines the degrees of actuation on a basis of the operating condition parameters in relation to predetermined optimization criterion, and the degree of actuation being defined as a percentage of clutch engagement on a scale from a fully disengaged condition to a fully engaged condition;

basing the transmission model on slip; and adjusting the first and the second clutches to the determined degrees of actuation.

2. The method according to claim 1, further comprising determining a plurality of the degrees of actuation of the first and the second clutches for a sequence of future fixed time-points, and adjusting the first and the second clutches, at the fixed time points, to the degrees of actuation corresponding the fixed time points.

3. The method according to claim 2, further comprising predetermining an end time at which the gearshift is completed, and repeatedly redetermining the optimized degrees of actuation of the first and the second clutches to provide optimized pluralities of degrees of actuation for a time that remains until the end time.

4. The method according to claim 2, further comprising determining actuation trajectories for the first and the second clutches on a basis of the degrees of actuation, and the actuation trajectories being defined as the degree of actuation of the first and the second clutches over a predetermined time interval.

5. The method according to claim 1, further comprising controlling the gearshift from the first gear to the second gear in the transmission with a control system for the first and the second clutches; and determining the degrees of actuation, predictively taking into account a desired load torque.

6. The method according to claim 1, further comprising forming the transmission with two transmission groups which are connected in series with one another.

7. A control device for controlling a gearshift from a first gear to a second gear in a transmission which has an input shaft and an output shaft; first and second step-down devices for providing various step-down ratios; a first clutch being associated with the first step-down device and a second clutch being associated with the second step-down device in order to connect the respective step-down devices in a torque-transmitting manner between the input shaft and the output shaft; and the first gear being obtainable by actuating the first clutch and the second gear by activating the second clutch, the control device comprising:

an interface for detecting operating condition parameters of the transmission, the operating condition parameters comprising at least one of a rotational speed and a transmitted toque of at least one of the input shaft, the output shaft, the first clutch, the second clutch, an intermediate shaft, and input sides and output sides of the first and the second step-down devices;

a processing device for determining optimized degrees of actuation of the first and the second clutches by a search method related to a transmission model, which determines the degrees of actuation of the first and the second clutches on a basis of the operating condition parameters in relation to a predetermined optimization criterion, and the degree of actuation being defined as a percentage of clutch engagement on a scale from a fully disengaged condition to a fully engaged condition;

the transmission model is based on slip; and a control device for adjusting the first and the second clutches to the determined degrees of actuation.

8. A method of controlling a gearshift from a first gear to a second gear in a transmission having an input shaft, an output shaft, and first and second step-down devices for providing various step-down ratios, the first step-down device having a first clutch for connecting the first step-down device in a torque-transmitting manner between the input shaft and the output shaft, and the second step-down device having a second clutch for connecting the second step-down device in a torque-transmitting manner between the input shaft and the output shaft, the first gear being obtained by actuating the first clutch and the second gear being obtained by activating the second clutch, the method comprising:

determining operating condition parameters of the transmission the operating condition parameters comprising at least one of a rotational speed and a transmitted toque of at least one of the input shaft, the output shaft, the first clutch, the second clutch, an intermediate shaft, and input sides and output sides of the first and the second step-down devices;

determining optimized degrees of actuation of the first and the second clutches by a search method relating to a transmission model, which determines the degrees of actuation on a basis of the operating condition parameters in relation to a predetermined optimization criterion, and the degrees of actuation being defined as percentages of clutch engagement on a scale from a fully disengaged condition to a fully engaged condition;

basing the transmission model on clutch slip; and adjusting engagement of the first clutch to a determined degree of actuation of the first clutch and adjusting engagement of the second clutch to a determined degree of actuation opt the second clutch.

9. The method according to claim 4, further comprising continually determining the actuation trajectories for the first and the second clutches while the gearshift is in progress.

* * * * *